United States Patent [19]

Kuzuhara

[11] Patent Number: 5,023,735
[45] Date of Patent: Jun. 11, 1991

[54] MAGNETIC HEAD SUPPORT DEVICE WITH DOUBLE GIMBAL STRUCTURE

[75] Inventor: Takashi Kuzuhara, Tokyo, Japan

[73] Assignee: Kabushiki Kaisha Toshiba, Kawasaki, Japan

[21] Appl. No.: 445,151

[22] Filed: Dec. 5, 1989

Related U.S. Application Data

[63] Continuation of Ser. No. 188,378, Apr. 29, 1988, abandoned.

[30] Foreign Application Priority Data

Apr. 30, 1987 [JP] Japan .............................. 62-106814

[51] Int. Cl.$^5$ .............................................. G11B 5/48
[52] U.S. Cl. .................................. 360/104; 360/110 S
[58] Field of Search ........................ 360/104, 105, 106

[56] References Cited

U.S. PATENT DOCUMENTS

| | | | |
|---|---|---|---|
| 4,291,350 | 9/1981 | King et al. ......................... | 360/104 |
| 4,807,070 | 2/1989 | Isozaki et al. ..................... | 360/104 |
| 4,811,143 | 3/1989 | Ohashi et al. ..................... | 360/105 |
| 4,841,396 | 6/1989 | Kawasaki ......................... | 360/104 |

FOREIGN PATENT DOCUMENTS 0051020 3/1987 Japan .................... 360/104
81/01071 4/1981 World Int. Prop. O. .......... 360/104

OTHER PUBLICATIONS

Japanese Patent Domestic Announcement (Kohyo) No. 58-501878, annouced on Nov. 4, 1983.
Japanese Patent Disclosure (Kokai) No. 59-36366, disclosed Feb. 28, 1984.
Japanese Patent Disclosure (Kokai) No. 59-54069, disclosed Mar. 28, 1984.

Primary Examiner—David J. Severin
Attorney, Agent, or Firm—Finnegan, Henderson, Farabow, Garrett and Dunner

[57] ABSTRACT

A magnetic head support device is characterized in that a first magnetic head is supported such that it inclined with respect to a surface of a flop disk, and a second magnetic head is supported such that it moves parallel to the other surface of the floppy disk. The second magnetic head is mounted on a carriage of the device via a support element. A movable portion of the support element on which the second magnetic head is mounted is coupled by two parallel gimbal plates to a stationary portion of the support element connected to the carriage.

6 Claims, 4 Drawing Sheets

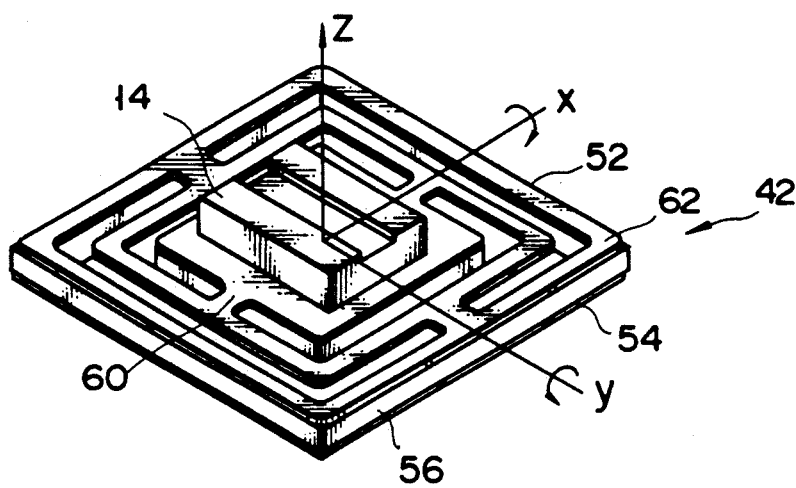
F I G. 4
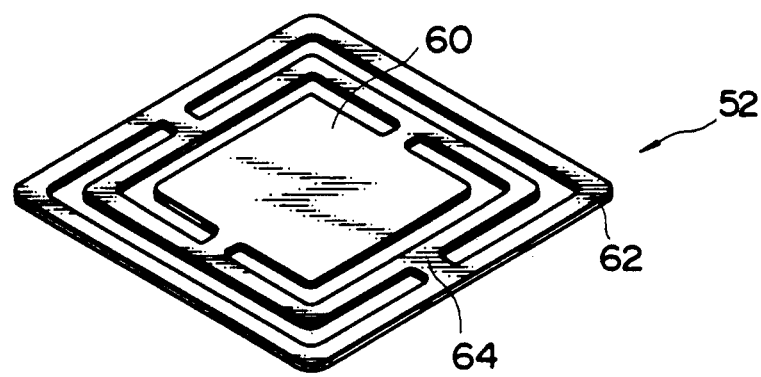
F I G. 5A
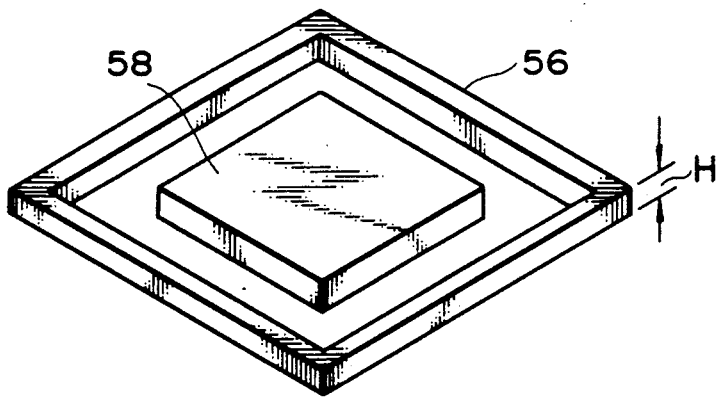
F I G. 5B
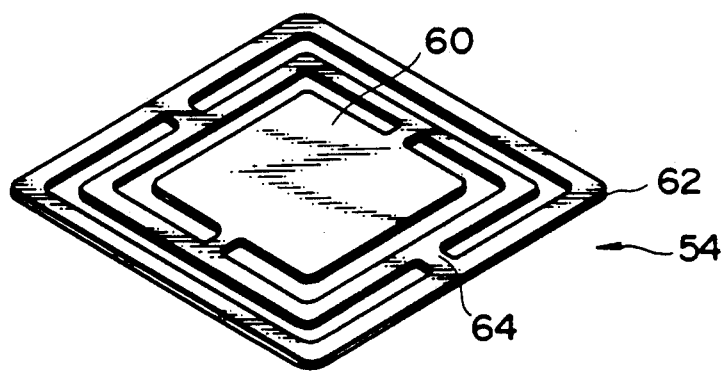
F I G. 5C

MAGNETIC HEAD SUPPORT DEVICE WITH DOUBLE GIMBAL STRUCTURE

This is a continuation of application Ser. No. 07/188,378, filed Apr. 29, 1988 now abandoned.

BACKGROUND OF THE INVENTION

1. Field of the Invention

The present invention relates to a floppy disk apparatus and, more particularly, to a magnetic head support device for a floppy disk apparatus.

2. Description of the Related Art

A double-sided type floppy disk apparatus comprises two magnetic heads which are supported by a magnetic head support device such that they oppose each other and sandwich a floppy disk therebetween, each magnetic head performing data read/data write in relation to one of the two surfaces (S0 and S1) of the disk.

Unlike a hard disk, a floppy disk may sometimes flex or become locally deformed. Since the magnetic heads come into contact with the disk, this may itself cause the disk to flex. Thus, the magnetic head support device must be able to ensure reliable contact, at all times, between the magnetic heads and the floppy disk, even when the disk is deformed, so as to prevent the occurrence of errors such as off-tracking or off-azimuthing.

With this requirement in mind, a variety of devices have been proposed for the supporting of the magnetic heads of a conventional double-sided floppy disk recording/reproducing apparatus. One such device is disclosed in U.S. Pat. No. 4,291,350, and comprises a pair of magnetic heads which are arranged such that they oppose each other, in a symmetrical arrangement, each of the magnetic heads being supported by a carriage device, through a corresponding gimbal plate which is biased by a compression spring, through a center pivot. The magnetic heads mounted on the gimbal plates are pivotal about the axis (x-axis) extending in the access direction of the magnetic heads, and are also pivotal about the axis perpendicular to the x-axis, i.e., an axis (y-axis) extending along the tangential direction of disk rotation. In addition, the magnetic heads are movable along the axis (z-axis) perpendicular to the floppy disk surface. In this device, a pair of magnetic heads reliably follow local displacement of a disk. However, the loading positions of the magnetic heads are indefinite, and unloading postures of the magnetic heads are unstable, resulting in difficult adjustment. Particularly, in a recent and advanced floppy disk apparatus having a high track density and a high linear recording density, when the magnetic heads are inclined at a large angle, off-tracking or off-azimuthing may occur. U.S. Pat. No. 4,151,573 (Tandon et al.) discloses another type of magnetic head support device. In this device, an S0-side magnetic head is fixed, and an S1-side magnetic head is pivotal about the x- and y-axes and movable along the z-axis. A floppy disk is urged by the S1-side magnetic head toward the S0-side magnetic head, thereby suppressing displacement of the floppy disk. This device has good contact properties of the magnetic heads with the disk, and off-tracking rarely occurs. However, the magnetic head must be strongly urged against the disk, and the service life of the magnetic heads and the disk may be shortened due to wear.

SUMMARY OF THE INVENTION

It is, therefore, an object of the present invention to provide an improved magnetic head support device for suppressing an inclination of magnetic heads with respect to a disk surface, and for supporting the magnetic heads to be displaced in a direction perpendicular to the disk surface to follow the disk, and to provide a magnetic head support device which is free from off-tracking and/or off-azimuthing, has good contact properties between magnetic heads and a disk, and can prevent a service life of the magnetic heads and the floppy disk from being shortened.

In order to achieve the above object, a magnetic head support device according to the present invention comprises, carriage means for carrying first and second magnetic heads to predetermined operating positions with respect to a magnetic recording medium, gimbal plate means for coupling the first magnetic head to the carriage means and for supporting it so as to be able to be inclined with respect to a reference plane of the magnetic recording medium, said reference plane being a neutral plane of said planer magnetic recording medium in ideal flat condition, and a support element for coupling the second magnetic head to the carriage means for supporting it so as to be movable parallel to the reference plane of the flat magnetic recording medium.

BRIEF DESCRIPTION OF THE DRAWINGS

FIG. 4 is a perspective view of an improved support element used in the magnetic head support device shown in FIG. 2 or 3 according to the present invention; and FIGS. 5A to 5C are exploded views of the support element shown in FIG. 4.

DETAILED DESCRIPTION OF THE PREFERRED EMBODIMENTS

Figure 1:
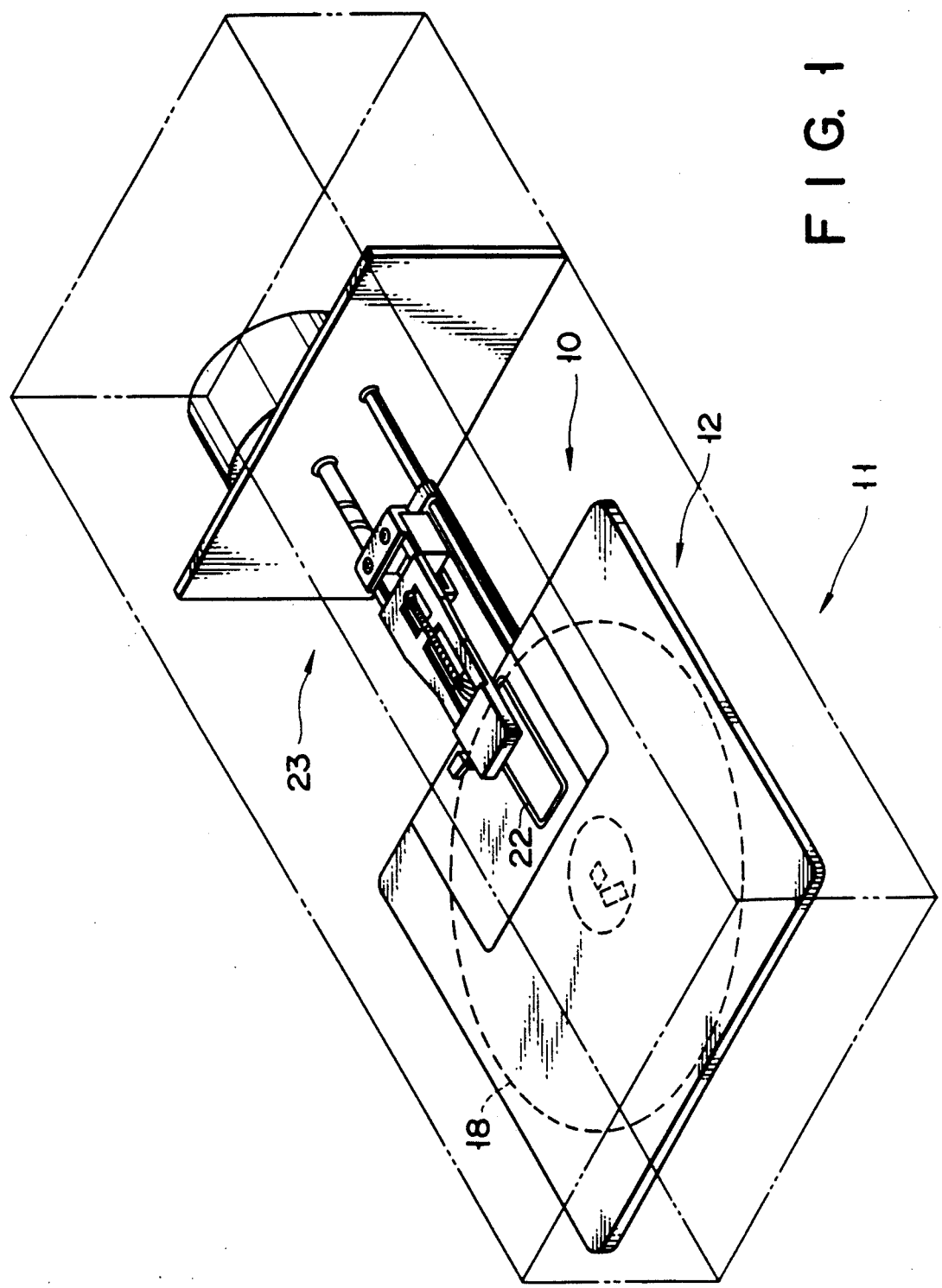
FIG. 1 is a schematic view of a floppy disk apparatus including a magnetic head support device according to the present invention.

An embodiment of a magnetic head support device according to the present invention will be described hereinafter in detail with reference to the accompanying drawings. Throughout the drawings, the same reference numerals denote the same parts or portions.

Figure 2:
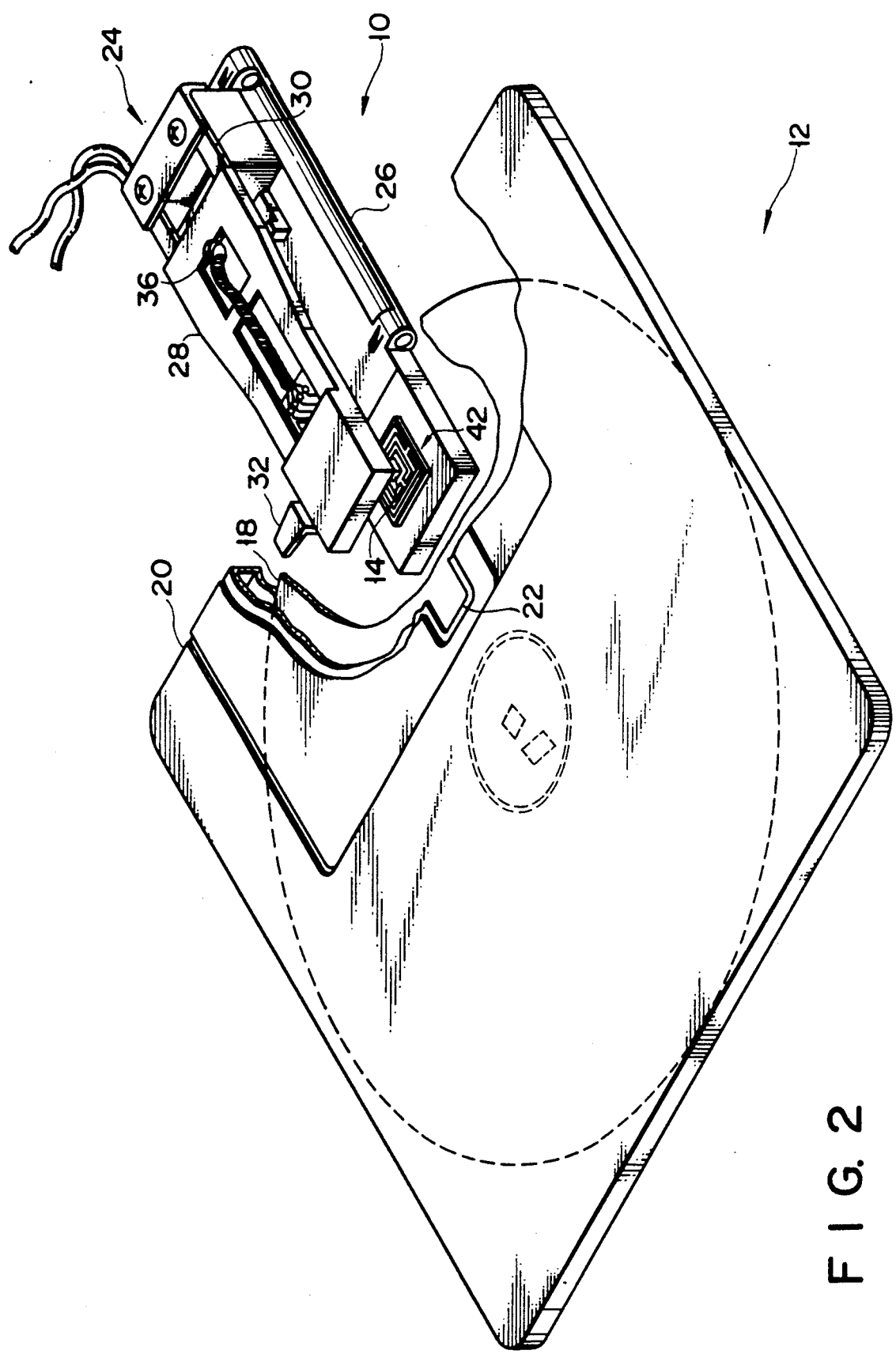
FIG. 2 is a perspective view showing an embodiment of a magnetic head support device according to the present invention.
Figure 3:
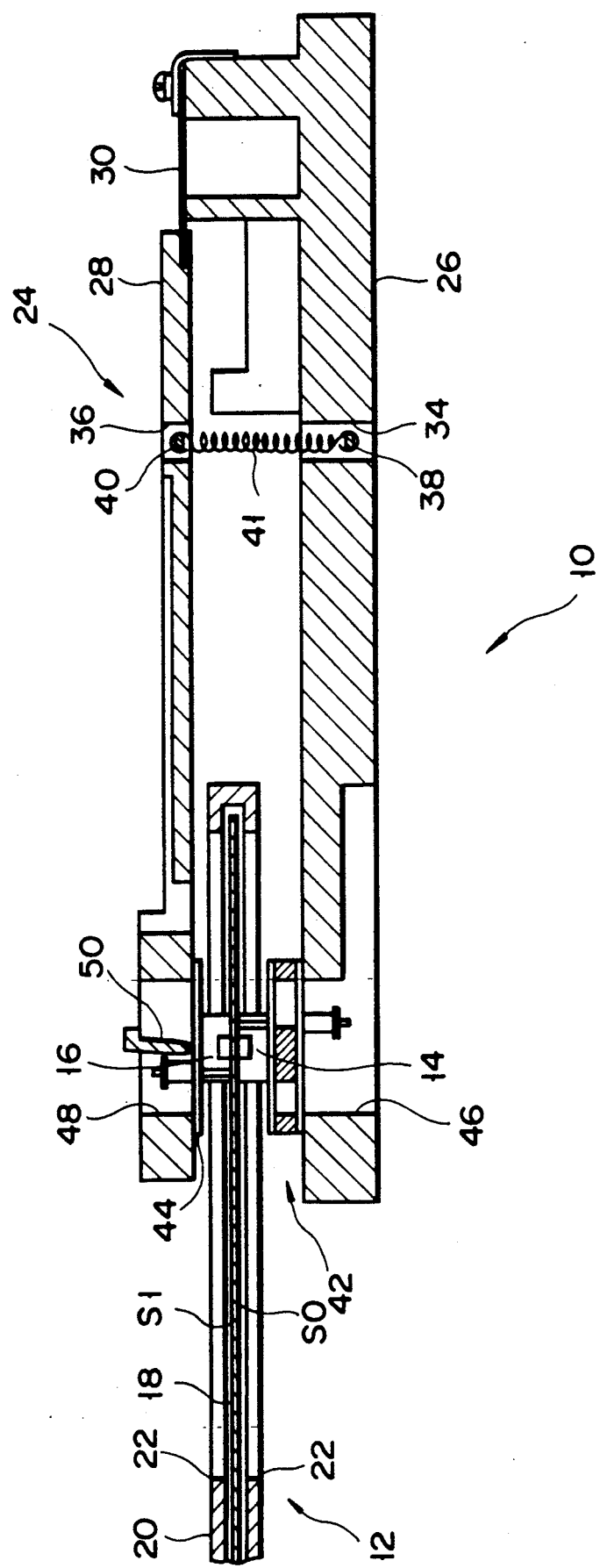
FIG. 3 is a schematic longitudinal sectional view of the embodiment shown in FIG. 2.

As is shown in FIG. 1, magnetic head support device 10 of the present invention is incorporated in floppy disk apparatus 11. Floppy disk assembly 12 having a floppy disk is loaded into floppy disk apparatus 11. Referring to FIGS. 2 and 3, magnetic head support device 10 supports magnetic heads 14, 16, which can be employed for reading out data from disk 18 or writing data on disk 18. In floppy disk assembly 12, disk 18 as a magnetic recording medium is housed in jacket or cartridge 20, and jacket or cartridge 20 has access slots 22 through which magnetic heads 14 and 16 can access the respective recording surfaces. A lower recording surface of disk 18 in FIG. 2 is called S0-side surface, and an upper recording surface is called S1-side surface. Disk 18 is held by means of a disk clamp/unclamp mechanism (not shown) to a spindle disposed in one end portion of a drive shaft of a disk drive unit (also not shown), and is driven to rotate by the unit. Reference may be made to U.S. Pat. No. 3879757, and a number of other patents for details of such features as a front door mechanism for allowing loading and unloading of the disk, and a carriage drive mechanism for positioning the carriage device in the disk radial direction along access slots 22, as well as the disk clamping mechanism and the disk drive unit.

The entire magnetic head support device 10 is movable in the radial direction of disk 18 by a carriage drive mechanism (not shown), thereby magnetic heads 14 and 16 changing track positions on disk 18.

As can be seen from FIG. 3, magnetic head support device 10 according to the present invention comprises carriage device 24 having carriage body 26 and carriage arm 28. The proximal end portion of carriage arm 28 is connected to that of carriage body 26 through copper plate 30 secured to carriage body 26 by screws. Engaging segment 32 protrudes laterally from the distal end portion of carriage arm 28. Carriage device 24 can be opened/closed by a magnetic head loading/unloading mechanism (not shown) engaged with engaging segment 32 of carriage arm 28, i.e., its distal ends can be moved toward or away from each other. Carriage body 26 and carriage arm 28 have through holes 34 and 36 at their central portions respectively, and bridge segments 38 and 40 are provided in through holes 34 and 36 respectively. Tension spring 41 is laid between bridge segments 38 and 40, thereby biasing carriage body 26 and carriage arm 28 toward each other. When carriage device 24 is open, floppy disk assembly 12 can be interposed between body 26 and carriage arm 28 and advanced to a position near the center of device 24. In this state, magnetic heads 14 and 16 are located near the edges of access slots 22 adjacent to the center of the disk.

Magnetic head support device 10 has S0-side magnetic head 14 at the distal end portion of carriage body 26 and on the side facing disk 18. Magnetic head 14 is supported by carriage body 26 through support element 42. While, S1-side magnetic head 16 is arranged at the distal end portion of carriage arm 28. Magnetic head 16 is supported on carriage arm 28 through gimbal plate 44. Rectangular grooves 46 and 48 are respectively formed in the distal end portions of carriage body 26 and carriage arm 28. Grooves 46 and 48 are respectively smaller than support element 42 and gimbal plate 44. T-shaped pivot arm 50 is provided to carriage arm 28. T-shaped pivot arm 50 is constituted by a lateral member crossing rectangular groove 48 and a vertical member extending downward from the lateral member toward substantially the center of gimbal plate 44. The lower distal end of pivot arm 50 abuts against substantially the central point of the surface of gimbal plate 44 facing the carriage arm so as to pivotally support it.

Gimbal plate 44 has the same shape as that of a support plate constituting support element 42 (to be described later) shown in FIG. 5A, and is formed of a sheet metal. Gimbal plate 44 has a substantially rectangular central portion for placing magnetic head 16 thereon, a peripheral portion to be secured to carriage arm 28, and a gimbal portion for connecting them in a manner like a gimbal. That is to say, central portion is held with respect to the peripheral portion in a manner like that the central portion is pivotal about the x- and y-axes, i.e., the central portion can be inclined in any direction with respect to the peripheral portion. Gimbal plate 44 with the above structure is cooperated with pivot arm 50, so that magnetic head 16 centrally placed on gimbal plate 44 can be inclined in any direction around the distal end of pivot arm 50 as a pivot.

Support element 42 provided to carriage body 26 has a shape, as shown in FIG. 4. Support element 42 has two support plates 52 and 54, and spacers 56 and 58 interposed therebetween, as can be seen from FIGS. 5A to 5C. Support plate 52 is a thin metal plate, and has substantially rectangular central portion 60 for placing magnetic head 14 thereon, rectangular peripheral portion 62 surrounding central portion 60, and connecting portion 64 for connecting these portions. Connecting portion 64 has rectangular intermediate portion arranged at equal intervals between central portion 60 and peripheral portion 62. The intermediate portion is connected to central portion 60 at two connecting projections extending along the x-axis in FIG. 4, and to peripheral portion 62 at another two connecting projections extending along the y-axis. Support plates 52 and 54 are the same in shape. Spacers 56 and 58 interposed between support plates 52 and 54 are formed of a metal in this embodiment, and have substantially the same thickness H. Spacer 56 has a shape substantially corresponding to peripheral portion 62 of support plate 52, and is interposed between peripheral portions of support plates 52 and 54 to connect them. Spacer 58 has a shape corresponding to central portion 60 of support plate 52, and is interposed between support plates 52 and 54 to connect them. In this embodiment, these components are bonded by a conventional method, such as an adhesion, and conventional gimbal plates can be utilized for support plates 52 and 54. Spacers 56 and 58 are sandwiched between the corresponding portions of the support plates, thus constituting a sandwich structure, and connecting portions 64 of two parallel gimbal plates connect therebetween. Thus, connecting portions of two support plates 52 and 54 serve as a so-called parallel leaf spring mechanism. Central portion 60 of support plate 52 on which the magnetic head is placed is moved along the z-axis to be substantially parallel to peripheral portion 62 of support plate 54 coupled to the carriage body 26.

The operating motion of the magnetic head support device with the above structure according to the present invention will be described hereinafter. In the floppy disk apparatus, magnetic heads 14 and 16 are kept apart from each other by the magnetic head loading/unloading mechanism. In this state, floppy disk assembly 12 is loaded. Disk 18 is rotated in jacket 20 by the disk drive unit, and magnetic head support device 10 is moved to a predetermined radial position of the disk by the carriage drive mechanism. Prior to data transfer, the magnetic head loading/unloading mechanism engaged with engaging segment 32 of carriage arm 28 is switched to release engaging segment 32, and magnetic heads 14 and 16 are brought into contact with the corresponding surfaces of disk 18 by the biasing force of spring 42. In this state, magnetic heads 14 and 16 are located at predetermined track positions, and data read/write access from/to disk 18 is performed in such a situation.

As described above, the disk may entirely flex or locally deform. With magnetic heads 14 and 16 being in contact with the disk, the disk may be flexed by the magnetic heads. Magnetic head 14 contacting recording surface S0 is not so inclined with respect to a reference plane which is the symmetrical or neutral plane of an ideal disk free from flexure, due to the function of support element 42, i.e., is substantially parallel to the reference plane, and is moved in a direction perpendicular to the reference plane so as to follow a local deviation of disk 18. In contrast to this, magnetic head 16 contacting surface S1 can be desirably inclined with respect to the reference plane due to operation of ginbal plate 44. However, since S0-side magnetic head 14 is not almost inclined with respect to the reference plane, inclination of S1-side magnetic head 16, which is arranged to oppose head 14 and clamps disk 18 together therewith, with respect to the reference plane is also suppressed. Since magnetic head 14 can be moved in the direction perpendicular to the reference plane to follow local deviation of disk 18, magnetic head 16 cooperating with head 14 can also follow disk 18 in this direction.

Inclination of a pair of magnetic heads 14 and 16 with reference to the reference plane is suppressed, and they are movable in a direction perpendicular to the reference plane to follow the disk. Therefore, in the device of the present invention, off-tracking and/or off-azimuthing can be reduced, and a tracing characteristic upon local displacement of the disk can be improved. The magnetic head support device of the present invention allows reliable data read/write access to a disk without increasing a pressing force of the magnetic heads to the disk.

The present invention is not limited to the above embodiment, and it is to be understood that various changes and modifications may be made within the spirit and scope of the invention.

The connecting portions of the support element may have any shape if the central portion for placing a magnetic head thereon can be movable with respect to the peripheral portion while inclination is suppressed, and is not limited to a ginbal shape. The S0-side magnetic head is mounted on the carriage body through the support element, and the S1-side magnetic head is mounted on carriage body through the gimbal plate in the above embodiment. However, the S0-side magnetic head may be mounted on the carriage body through the gimbal plate, and the S1-side magnetic head may be mounted on the carriage arm through the support element.

What is claimed is:

1. A magnetic head support device for maintaining a first and a second magnetic head in operative relation with opposite sides of a non-rigid planar magnetic recording medium, the first and second magnetic heads being capable of reading data from or writing data on a respective side of the recording medium, the recording medium defining a reference plane during ideal conditions, the support device comprising:

carriage means for carrying said first and second magnetic heads to predetermined positions with respect to said magnetic recording medium;

gimbal plate means for supporting said first magnetic head on said carriage means and allowing said first magnetic head to roll and to move perpendicular to the reference plane; and support means for supporting said second magnetic head on said carriage means and for resisting rolling of said second magnetic head and allowing said second magnetic head to move while it is kept substantially parallel to said reference plane, said support means including:

a first gimbal plate having a central portion on which said second magnetic head is mounted, the central portion being coplanar with and pivotable about first and second orthogonal pivot axes, a frame-like peripheral portion located around said central portion with a predetermined interval therebetween, and a frame-like gimbal portion arranged between and connecting said central portion and said peripheral portion, wherein said central portion is pivotable about said first and second orthogonal pivot axes;

a second gimbal plate, mounted on said carriage means and including a central portion, the central portion being coplanar with and pivotable about third and fourth orthogonal pivot axes, a frame-like peripheral portion located around said central portion with a predetermined interval therebetween, and a frame-like gimbal portion arranged between and connecting said central portion and said peripheral portion, wherein said second gimbal plate is disposed substantially parallel to said first gimbal plate, and wherein a peripheral portion of said second gimbal plate is mounted on said carriage means; and spacer means arranged between and connecting said first and second gimbal plates, said spacer means for maintaining said gimbal plates substantially parallel to and a predetermined distance apart from each other, said spacer means including a first portion fixed between said central portions of said first and second gimbal plates said first portion of said spacer means having a pair of opposite surfaces which are in surface contact with said central portions of said first and second gimbal plates, respectively, and including a frame-like second portion fixed between said peripheral portions of said first and second gimbal plates and located around said first portion of said spacer means.

2. A device according to claim 1, wherein each of said gimbal portions of said first and second gimbal plates includes a pair of first coupling segments which extend along one of the orthogonal pivot axes of each gimbal plate and are coupled to said central portion of each respective gimbal plate, and a pair of second coupling segments which extend along the other pivot axis of each gimbal plate and are coupled to said peripheral portion of each respective gimbal plate.

3. A device according to claim 1, wherein said first portion of said spacer means has a rectangular shape identical in size to said central portions of said first and second gimbal plates.

4. A support element for supporting a magnetic head on carriage means such that the magnetic head is movable from an initial position substantially parallel to a mounting surface of the carriage means, the support element comprising:

a first gimbal plate having a central portion on which said magnetic head is mounted, a frame-like peripheral portion located around said central portion with a predetermined interval therebetween, and a frame-like gimbal portion arranged between and connecting said central portion and said peripheral portion, wherein said central portion is pivotable about two orthogonal axes intersecting in said central portion;

a second gimbal plate having a central portion, a frame-like peripheral portion located around said central portion with a predetermined interval therebetween, and a frame-like gimbal portion arranged between and connecting said central portion and said peripheral portion, wherein said central portion is pivotable about two orthogonal axes intersecting in said central portion, wherein said second gimbal plate is disposed substantially parallel to said first gimbal plate, and wherein a peripheral portion of said second gimbal plate is mounted on said carriage means; and spacer means arranged between and connecting said first and second gimbal plates, said spacer means for maintaining said gimbal plates substantially parallel to and a predetermined distance apart from each other, said spacer means including a first portion corresponding to said central portions of said first and second gimbal plates and a frame-like second portion corresponding to said peripheral portions of said first and second gimbal plates, said second portion being located around said first portion.

5. An element according to claim 4, wherein each of said gimbal portions of said first and second gimbal plates includes a pair of first coupling segments which extend along one of the orthogonal pivot axes of each gimbal plate and are coupled to said central portion of each respective gimbal plate, and a pair of second coupling segments which extend along the other pivot axes of each gimbal plate and are coupled to said peripheral portion of each respective gimbal plate.

6. A support element according to claim 4, wherein said first portion of said spacer means has a rectangular shape identical in size to said central portions of said first and second gimbal plates.

* * * * *